(12) United States Patent
Clouse (10) Patent No.: US 6,880,480 B2
(45) Date of Patent: Apr. 19, 2005

(54) TACKLE ORGANIZER

(75) Inventor: Gary L. Clouse, Gallatin, TN (US)

(73) Assignee: Genmar IP LLC, Minneapolis, MN (US)

( * ) Notice: Subject to any disclaimer, the term of this patent is extended or adjusted under 35 U.S.C. 154(b) by 280 days.

(21) Appl. No.: 10/193,610

(22) Filed: Jul. 10, 2002

(65) Prior Publication Data

US 2003/0234193 A1 Dec. 25, 2003

Related U.S. Application Data

(60) Provisional application No. 60/390,737, filed on Jun. 21, 2002.

(51) Int. Cl.[7] ............................................. B63B 17/00
(52) U.S. Cl. ........................................................ 114/343
(58) Field of Search ................................ 114/343, 364, 114/255

(56) References Cited

U.S. PATENT DOCUMENTS

| | | |
|---|---|---|
| 3,674,170 A | 7/1972 | Thorpe et al. |
| 3,824,733 A | 7/1974 | Cordell, Jr. |
| 3,834,340 A | 9/1974 | Thorpe |
| 3,889,805 A | 6/1975 | Korten |
| 4,170,801 A | 10/1979 | Ward |
| 4,513,526 A | 4/1985 | Grace et al. |
| 4,628,628 A | 12/1986 | Burgin et al. |
| 4,662,303 A | 5/1987 | Duff |
| 4,671,009 A | 6/1987 | Faunce |
| 4,770,327 A | 9/1988 | Fortson |
| 4,805,859 A | 2/1989 | Hudson |
| 4,827,864 A | 5/1989 | LaMontagne et al. |
| 4,974,537 A | 12/1990 | Martin |
| 5,048,447 A * | 9/1991 | Vicari .......................... 114/255 |
| 5,094,375 A | 3/1992 | Wright |
| D326,378 S | 5/1992 | Yunger et al. |
| 5,127,355 A | 7/1992 | Magers et al. |
| D335,577 S | 5/1993 | Malmanger et al. |
| 5,421,283 A | 6/1995 | Bruggemann et al. |
| 5,426,885 A | 6/1995 | Wittman |
| 5,582,313 A | 12/1996 | Envall |
| 5,593,061 A * | 1/1997 | Prochnow .................... 220/507 |
| 5,704,158 A | 1/1998 | Whiteaker |
| 5,975,002 A * | 11/1999 | Rieger ......................... 114/343 |
| 6,574,911 B1 * | 6/2003 | Hurst et al. ................... 43/54.1 |

OTHER PUBLICATIONS

"Let Em Eat Wake.," *Outboard Marine Corporation, Fishing Boat Group, Inc.*, Javelin Boats 1996 Catalog, 4 pages (©1995).

"Javelin Boats—Catalog," *Outboard Marine Corporation, Fishing Boat Group*, 4 pages (1992).

"Hydra–Sports®—Catalog," *Outboard Marine Corporation, Fishing Boat Group*, 3 pages (1992).

"Gambler Bass Boats," *Maritec Industries, Inc.*, 6 pages (Date: Publicly known more than one year prior to the filing date of the present application).

* cited by examiner

*Primary Examiner*—Stephen Avila
(74) *Attorney, Agent, or Firm*—Merchant & Gould P.C.

(57) ABSTRACT

A tackle organizer system that organizes fishing tackle and equipment at a storage location inboard a boat. The system includes a storage box, a multiple-port organizer insert, and a storage tray that defines one or more storage recesses. The system further provides securable storage for fishing tackle and equipment in both a vertical orientation and a horizontal orientation.

24 Claims, 5 Drawing Sheets

TACKLE ORGANIZER

CROSS-REFERENCE TO RELATED APPLICATIONS

This application claims the benefit of a U.S. Provision Application Ser. No. 60/390,737 filed on Jun. 21, 2002 having entitled TACKLE ORGANIZER, the Provisional Application of Jun. 21, 2002 being herein incorporated by reference.

TECHNICAL FIELD

The principles disclosed relate to a system of organizing and storing fishing tackle and equipment. More particularly, this disclosure concerns an organizer and system that mounts within a cavity of a boat for organizing and securely storing fishing tackle and equipment.

BACKGROUND

A wide variety of storage systems have been utilized to store and organize fishing tackle and equipment. Some common arrangements for use on a boat concern storage box structures that attach to the boat in areas that obstruct the fishing platform or user space. Other arrangements have a storage area located within the deck or platform of the boat, yet are non-compartmentalized and unsecured. Thus fishing tackle and equipment of various sizes shift, slide, and tip within the storage area during operation of the boat.

In general, improvement has been sought with respect to such storage arrangements, generally to: provide versatility with regards to storage capacity for various sized fishing tackle and equipment; provide better access to and organization of stored fishing tackle and equipment of various sizes; and provide a system that better secures stored fishing tackle and equipment during operation of the boat.

SUMMARY

One aspect of the present invention relates to an enhanced system for organizing and storing tackle in a boat. Another aspect of the present invention relates to a tackle organizer system including a storage box having at least one multiple slot organizer configured to laterally receive and secure a plurality of tackle boxes, and the method of organizing and securing tackle boxes therein.

DETAILED DESCRIPTION

With reference now to the various figures in which identical elements are numbered identically throughout, a description of various exemplary aspects of the present disclosure will now be provided.

Figure 2:
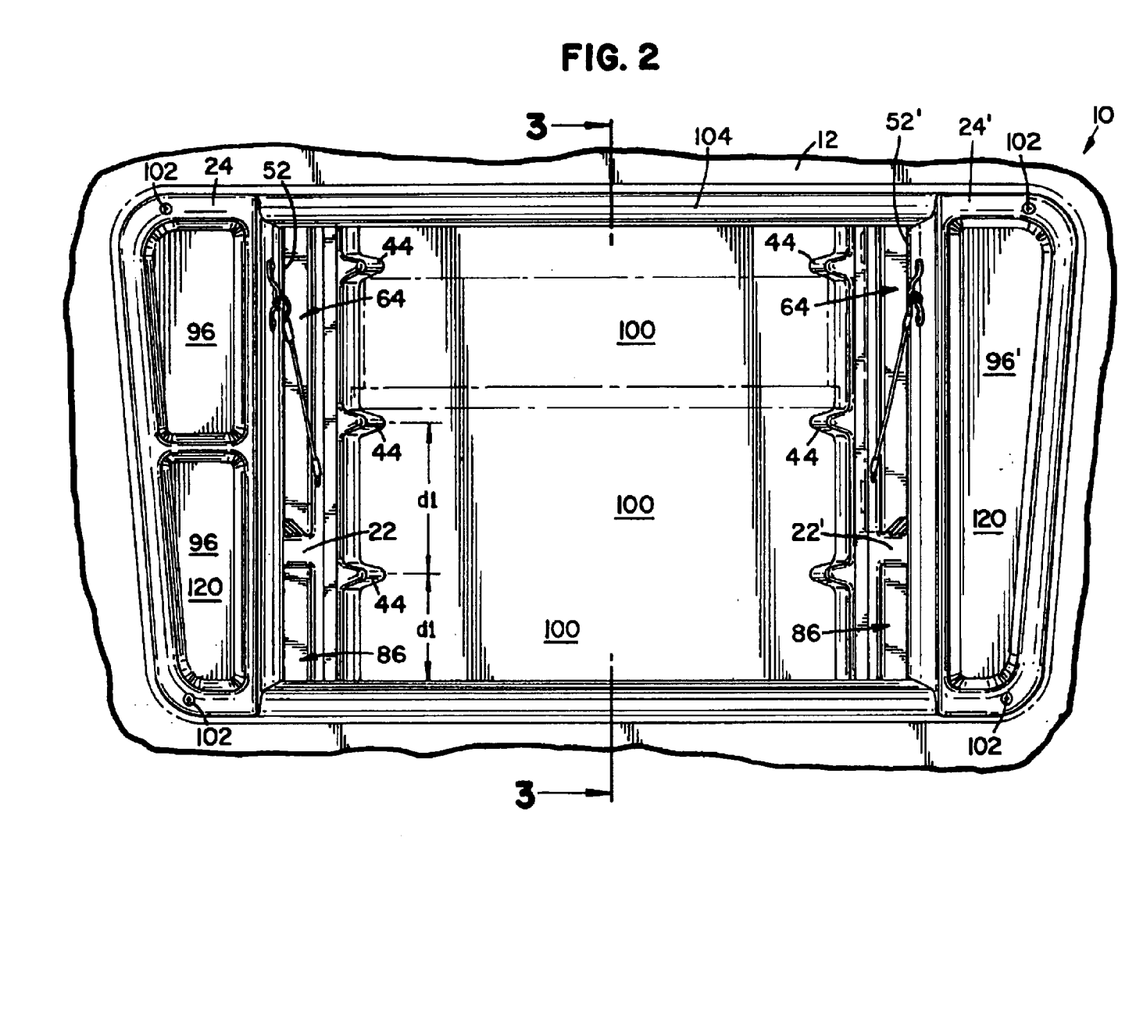
FIG. 2 is a top plan view of another embodiment of a tackle organizer system in accord with the principles of this disclosure.
Figure 3:
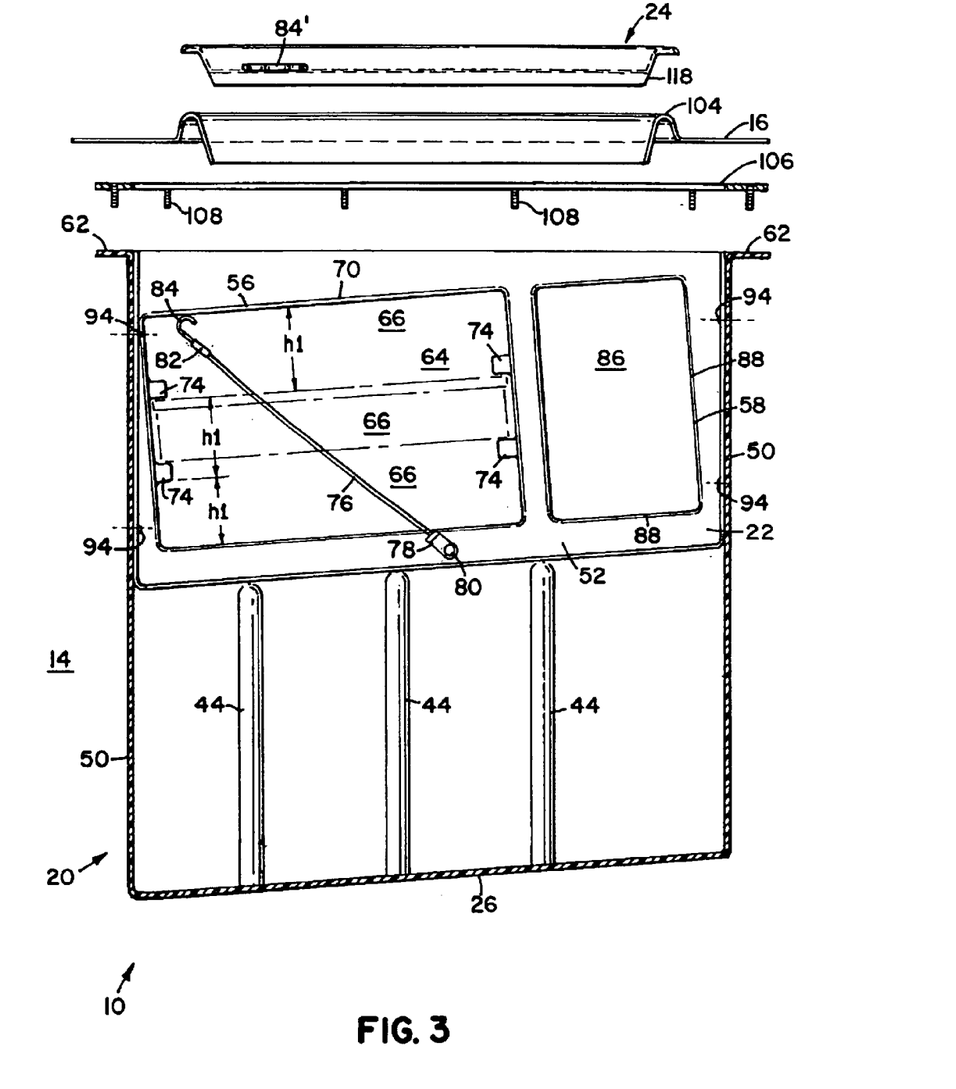
FIG. 3 is a cross-sectional view of the tackle organizer depicted in FIG. 2, taken along line 3—3.
Figure 4:
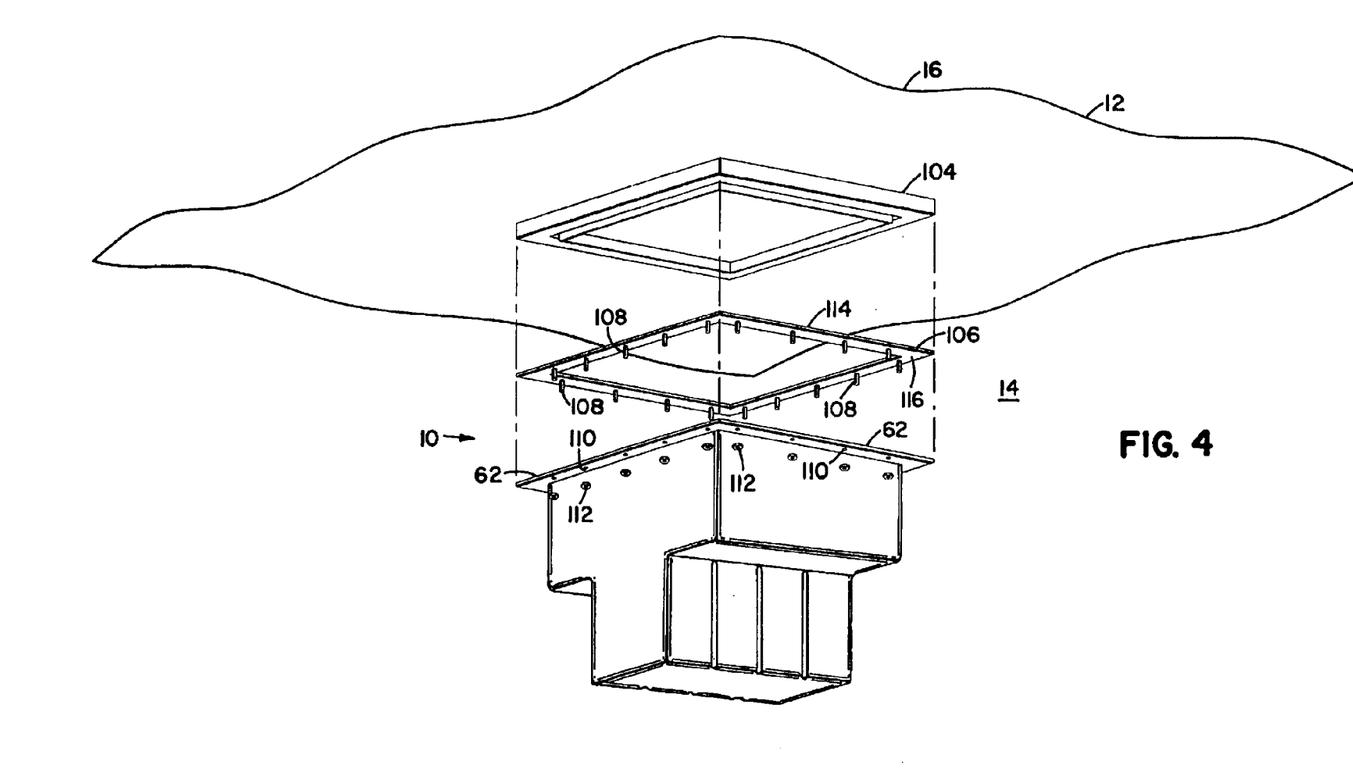
FIG. 4 is a schematic representation of a tackle organizer assembled to a boat in accord with the principles of this disclosure.

FIGS. 1–5 illustrate a tackle organizer system 10 for use with a boat 12 (partially illustrated). As schematically represented in FIG. 4, the tackle organizer system 10 preferably mounts adjacent an opening formed within the main inboard walking area, deck, or platform 16 of the boat. The opening accesses a large cavity 14 or open space located between the boat platform 16 and the boat hull. Preferably, the tackle organizer system is configured to fit within the cavity 14 of the boat 12. In the alternative, the tackle organizer system 10 may mount within a storage structure extending above the primary boat deck or platform 16. Typically a hinged cover (not shown) is pivotally coupled to the platform 16. The cover opens and closes to provide access to and enclose the tackle organizer system 10.

Figure 1:
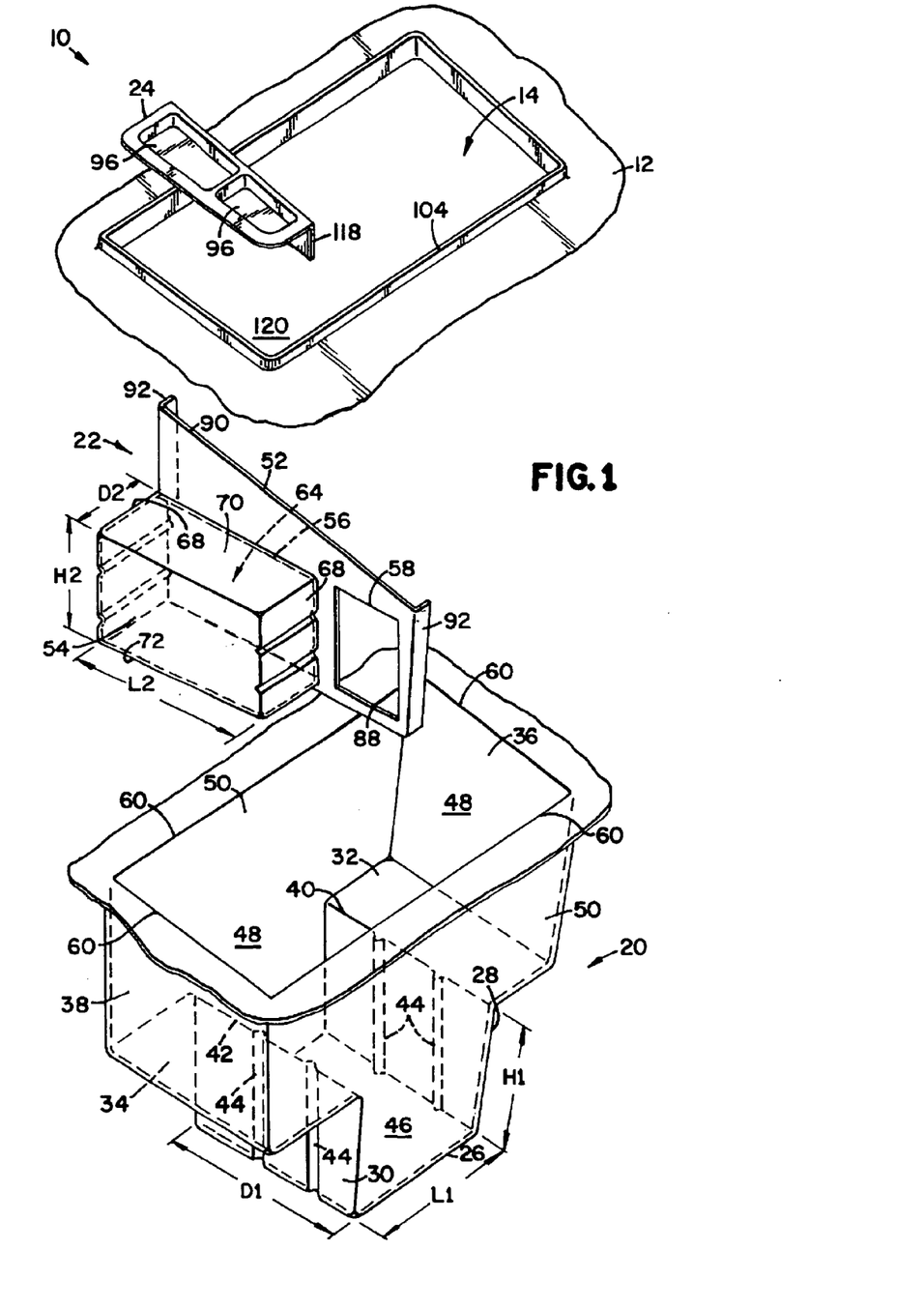
FIG. 1 is an exploded perspective view of one embodiment of a tackle organizer system in accord with the principles of this disclosure.

Referring now to FIG. 1, some components of tackle organizer system 10 are shown in an exploded assembly view. The tackle organizer system 10 generally includes a primary storage box 20 defining a storage compartment that mounts within the cavity 14 of the boat, at least one organizer insert 22 and at least one storage tray 24.

The storage box 20 includes a lower region 46 and two upper regions 48. The lower region 46 is generally defined by a lower base 26 centrally located and extending between a first lower wall 28 and a second lower wall 30. A first upper base 32 and a second upper base 34 connect with the first and second lower walls 28, 30 at first and second edges 40 and 42. The first and second upper bases 32, 34 and the first and second lower walls 28, 30 generally define a stepped construction or stepped portion of the storage box 20. A plurality of ribs or dividers 44 extend from proximate the lower base 26 to the first and second edges 40, 42 along each of the first and second lower walls 28 and 30. In one embodiment (FIG. 2), the first and second lower walls 28, 30 include three corresponding dividers 44 extending generally vertically and spaced apart from one another. In another embodiment, a different number of dividers may be arranged with varying spacing to accommodate vertical insertion of different sized tackle containers.

In the illustrated embodiment, the dividers 44 are integral with the first and second lower walls 28, 30. It is contemplated that the dividers may be separate components that attach within the lower region, either to the first and second lower walls 28, 30 or the sidewalls 50, to organize and contain fishing equipment or containers. The dividers may also comprise a drop-in arrangement (not shown) that rests within the lower region. The drop in arrangement can be a unitary drop-in arrangement or comprise various drop-in divider components.

The upper regions 48 are generally defined by a first upper wall 36 extending upward from the first upper base 32 and a second upper wall 38 extending upward from the second upper base 34. Sidewalls 50 transversely extend between each of the first and second upper walls 36 and 38 and the first and second lower walls 28 and 30 to form the overall storage box 20. The first and second upper walls 36 and 38 and the sidewalls 50 define an open top perimeter 60 of the storage box. As best shown in FIG. 4, the perimeter 60 includes a flange 62 for mounting the storage box 20 within the cavity 14 of the boat 12.

Referring back to FIG. 1, the lower region 46 of the storage box 20 has a length L1, a height H1, and a depth D1. The length L1 is defined as the distance between the first lower wall 28 and the second lower wall 30. The height H1 is defined as the general distance from the lower base 26 to either of the upper bases 32, 34. The depth D1 is defined as the distance between the sidewalls 50. The tackle organizer system illustrated preferably has a length L1 in the range of 10 to 18 inches; a height H1 in the range of 5 to 12 inches; and a depth D1 in the range of 10 to 36 inches. More preferably, the length L1 is between 12 and 16 inches; the height H1 is between 7 and 10 inches; and the depth D1 is between 15 and 21 inches. Most preferably, the length L1 is about 14 inches, the height H1 is about 8.5 inches; and the depth D1 is about 18 inches.

The dividers 44 are spaced a distance d1 apart from one another to divide the depth D1 of the box 20 into generally vertical storage compartments or sub-compartments 100. What is meant by generally vertical is that the storage compartments are vertical or almost vertical. The distance d1 between the dividers is sized to accommodate one or more standard tackle boxes, hereinafter described in greater detail. The distance d1 of the illustrated embodiment is preferably in the range of 2 to 6 inches. More preferably, the distance d1 is between 3.5 and 5.5 inches.

The length, height and depth of the storage box 20 track may vary according to the configuration of the boat within which the tackle organizer system is installed. Therefore, it is to be understood that the dimensions may be longer or shorter to accommodate: boats having more or less storage space, and, fishermen who require organization of more or less fishing tackle.

The storage box can be manufactured from plastic, such as polypropylene. Preferably, the storage box is made of a material that can be molded. Other suitable materials and methods of manufacture are contemplated.

FIGS. 1 and 3 illustrate one embodiment of the organizer insert 22 of the tackle organizer system 10. The organizer insert 22 generally has a front 52 and a back 54. The front 52 includes two openings: a first opening 56 and a second opening 58.

The first opening 56 extends into a multiple port or multiple slot storage area 64 having a plurality of lateral or side compartments, i.e. slots or storage ports 66 at which tackle boxes may laterally inserted for storage. What is meant by laterally inserted is that the tackle box can be inserted into the storage slots by moving the tackle boxes in a generally sideways direction, such as a horizontal direction or a direction having at least a horizontal component (e.g. a direction angled relative to vertical). In the preferred embodiment, the tackle boxes are laterally inserted from a region adjacent the lower region 46 and between the two upper regions 48 toward the upper wall 36, 38 of the storage box 20. In an alternative embodiment, the compartments of the multiple slot storage area could also vertically receive tackle boxes.

The multiple slot storage area 64 is defined by the back 54 of the organizer insert, sidewalls 68 extending between the front 52 and back 54, and a top wall 70 and a bottom wall 72. The storage ports 66 are further defined by extensions or rails 74 formed on the sidewalls 68 that extend from proximate the first opening 56 of the organizer insert toward the back 54. The rails 74 project from each of the sidewalls 68 generally toward the opposing sidewall. In the alternative, the rails may be a separate manufactured component adhered or fastened to the sidewalls to compartmentalize the storage area 64.

As shown in FIG. 1, the multiple slot storage area 64 of the organizer insert 22 has a length L2, a height H2, and a depth D2. The length L2 is defined as the distance between the sidewalls 68. The height H2 is defined as the distance between the top wall 70 and the bottom wall 72. The depth D2 is defined as the distance between the front 52 and the back 54 of the organizer insert 22. The multiple slot storage area 64 illustrated preferably has a length L2 in the range of 6 to 15 inches; a height H2 in the range of 4 to 10 inches; and a depth D2 in the range of 5 to 9 inches. More preferably, the length L2 is between 9 and 11 inches; the height H2 is between 6 and 8 inches; and the depth D2 is between 6 and 8 inches. Most preferably, the length L2 is about 10.5 inches, the height H2 is about 7 inches; and the depth D2 is about 7 inches.

As shown in FIG. 3, the rails 74 divide the height H2 of the multiple slot storage area 64 into generally horizontal storage compartments or storage slots 66. What is meant by generally horizontal is that the slots are horizontal or almost horizontal. The distance h1 between the rails is sized to accommodate standard tackle boxes, hereinafter described in greater detail. The distance h1 of the illustrated embodiment is preferably in the range of 1 to 3 inches. More preferably, the distance h1 is about 2 inches.

The length, height and depth of the multiple slot storage area 64 may vary according to the configuration of the boat within which the tackle organizer system is installed. Therefore, it is to be understood that the dimensions may be longer or shorter to accommodate: boats having more or less storage space, and, fishermen who require organization of more or less fishing tackle.

The multiple slot storage area 64 illustrated in the Figures depicts the storage compartments 66 arranged in a generally horizontal configuration. It is contemplated that the multiple port storage area can also include generally vertical storage compartments by locating rails or dividers on the bottom wall 72 and the top wall 70. In the alternative, dividers may be located on the back wall 54 to define vertical storage compartments. Further a combination of horizontal and vertical compartments could be provided in this area 64 by including a dividing wall within the storage area 64 separating horizontal storage compartments and vertical storage compartments.

The organizer insert 22 includes a securing member 76 located adjacent the first opening 56 to secure horizontally stored tackle boxes within the storage slots 66. In the illustrated embodiment, the securing member comprises an elastic cord or strap that extends across each of the storage slots 66. As shown, one end 78 of the securing member 76 is connected at a lower connection 80 on the front 52 of the organizer insert 22. In use, an opposite end 82 of the securing member 76 is detachably connected at an upper connection 84. In one embodiment the upper connection 84 (shown generally) may be located on the front 52 of the organizer insert 22. In another embodiment, the upper connection 84' is located on the storage tray 24. Other types of securing members that secure the contents of the storage slots are contemplated. For example, the rails may include retaining ridges or protrusions located toward the opening designed to retain the corners of stored tackle boxes. In the alternative, the organizer insert may include a door or cover that hinges or slides to enclose the multiple slot storage area 64.

The second opening 58 of the organizer insert 22 extends into a utility storage area 86 in which a variety of fishing equipment and tackle may be stored. What is meant by utility storage area is that the area is not configured to store equipment in a particular orientation or store equipment of a particular shape and size. Rather the utility storage area is a general all-purpose storage area that may be used when it is desirable to loosely store objects and equipment. The utility storage area 86 is open and free of dividers or other compartmentalizing structure. The utility storage area 86 is partially defined by the storage box 20 when assembled. The front 52 of the organizer insert has a periphery lip or edge 88 around the second opening 58 that assisting is containing equipment or tackle within the utility storage area 86. In alternative embodiments, a door or cover may hinge or slide to enclose the utility storage area 86.

As best shown in FIG. 1, the front 52 of the organizer insert 22 includes an outer perimeter 90 having flanges 92. The flanges 92 have mounting structure 94 (see FIG. 3) to mount the organizer insert 22 to the storage box 20. The organizer insert 22 is mounted in the upper region 48 of the storage box 20. The organizer insert is designed to provide easy access to the multiple slot storage area 64 and the utility storage area 86 without interfering with access to the vertical storage compartments 100 located in the lower region 46 of the storage box 20.

As can be seen in FIG. 2, the tackle organizer system 10 may include two organizer inserts. A first organizer insert 22 is positioned in one of the upper regions 48 and a second organizer insert 22' is positioned in the other upper region. The first and second organizer inserts 22, 22' are opposingly oriented to provide access to the front openings of each insert. Specifically, the front 52 of the first insert 22 faces the front 52' of the second insert 22'.

The organizer insert 22 can be manufactured from plastic, such as polypropylene. Preferably the organizer insert is made of a material that can be molded. Other suitable materials and methods of manufacture are contemplated.

Referring now to FIGS. 1 and 2, the storage tray 24 of the tackle organizer system 10 is a single piece construction having either one or two indentations or recess for storing general fishing equipment or tackle. In one embodiment, the tackle organization system 10 includes two storage trays 24, 24': one having a double-recess arrangement 96, the other having a single-recess arrangement 96'. It is contemplated that the storage tray 24 may include any number of recess arrangements. Each of the recess arrangements 96, 96' has a non-symmetrical configuration that angles or narrows toward one end. This configuration accommodates storage of non-symmetrically shaped fishing equipment.

The storage tray 24, 24' includes mounting locations 102 for attaching or securing the storage tray. As shown best in FIGS. 2 and 3, the storage tray is secured to mounting structure 104 of the deck 16, as will be described in greater detail hereinafter. Preferably, the storage tray 24, 24' is located adjacent and above the organizer insert 22, 22' in a top-accessible region 120. In this region, quick access is provided to equipment or tackle that is frequently used and stored within the recess arrangements 96, 96' of the trays 24, 24'. This arrangement does not limit access to either the organizer insert 22 or the vertical storage compartments 100 located in the lower region of the primary storage box 20.

In the illustrated embodiment, the storage tray 24 includes a front extension 118 (see FIGS. 1 and 3). The front extension extends toward the organizer insert 22. As best shown in FIG. 3, the upper connection 84' may be mounted on the extension 118 at a location the permits the securing member 76 to span across the multiple slot storage area 64 of the system 10.

Figure 5:
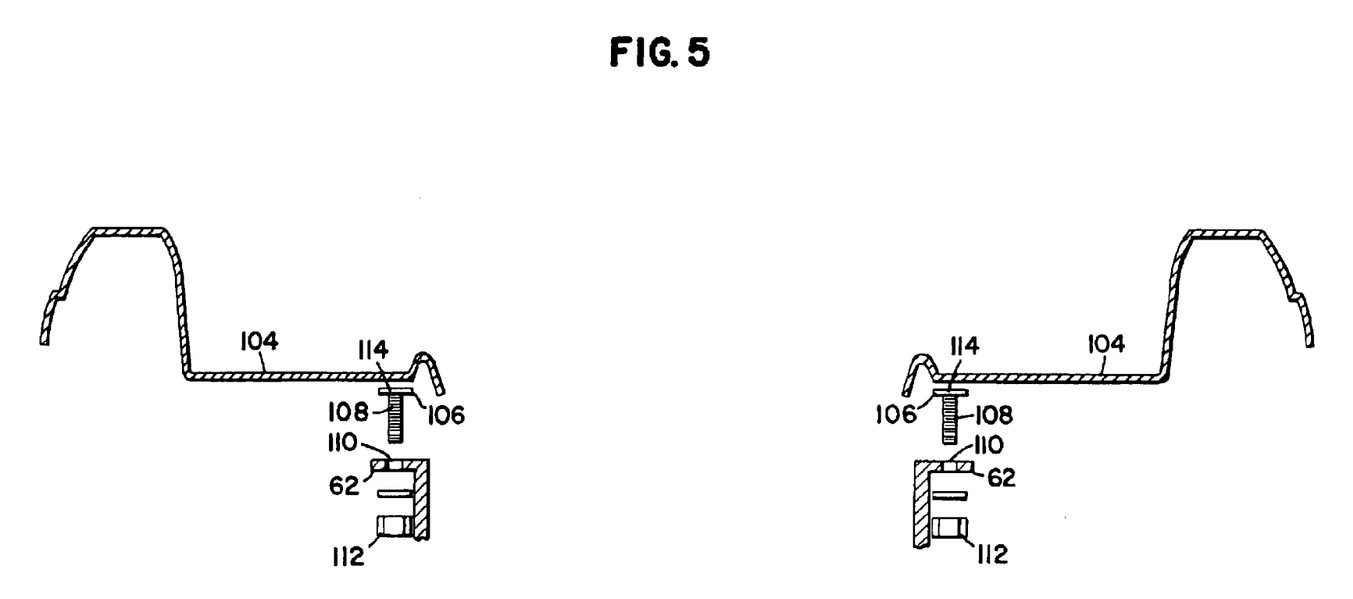
FIG. 5 is an enlarged schematic cross-sectional representation of a tackle organizer assembled to a boat in accord with the principles of this disclosure.

Referring now to FIGS. 4 and 5, a general assembly of the tackle organizer system 10 is schematically shown mounted beneath the platform 16 of a boat 12. A mounting strip 106 is provided and positioned along the flange 62 of the storage box 20, between the storage box 20 and the deck 16. The mounting strip 106 has a first surface 114 and a second surface 116. The first surface 114 of the mounting strip is adhered to the mounting structure 104 of the deck 16. The mounting structure 104 may be manufactured integral with the deck 16 or include a separate mounting structure arrangement secured to the deck 16 of the boat. Conventional adhesives may be used to bond or join the mounting strip 106 to the mounting structure 104.

In the illustrated embodiment, the mounting strip 106 includes a plurality of fasteners 108 extending from the second surface 116 of the strip 106. The locations of the fasteners 108 corresponds to through holes 110 formed in the flange 62. The flange 62 of the storage box 20 is secured to the mounting strip 106 by positioning the fasteners 108 through the through holes 110 of the flange 62 and securing the fasteners 108 with nuts 112. Other mounting strip embodiments incorporating other fastening structures are contemplated. For example, the mounting strip may be riveted or adhered to the flange 64 of the storage box 20.

The storage trays 24 are mounted to the mounting structure 104 of the deck 16. In alternative embodiments, the storage trays may be mounted upon the organizer inserts 22 and simply rest adjacent or upon the mounting structure 104 of the deck 16.

In use, the present system is configured to fit and provide storage capacity within the floor of a boat to avoid creating obstacles on the boat platform. Some traditional fishing tackle organizers are placed directly on the boat platform or extend into the inboard walking area causing potential hazards for fishermen. In particular, the configuration of the length, height, and depth of the primary storage box 20 is designed to fit within a cavity 14 of a boat 12.

The system is designed to accommodate various sizes of fishing tackle. Generally, the tackle organizer system 10 is used in conjunction with the storage of fishing equipment and fishing tackle boxes or other similar utility boxes. Such boxes, such as those shown in phantom in FIGS. 2 and 3, typically have a rectangular configuration and include multiple storage slots within the box for storing fishing lures and gear. An exemplary box is a PLANO stow away box, model number 3730, manufactured by PLANO Molding Company. This particular stow away box is approximately 14×8.5×3 inches in size and fits securely within the vertical storage compartment located in the lower region 46 of the system. Another exemplary PLANO box, model number 3700, is approximately 14×8.5×2 inches in size. Two of these box models can be positioned securely within a vertical storage compartment. Yet another PLANO box for use with this system is PLANO model number 3600, having 11×7×1.75 inch dimensions. This exemplary box model fits securely within the horizontal storage ports 66 of the organizer insert 22.

Utility or tackle boxes may come in a wide range of heights, lengths, and widths. In storing utility or tackle boxes, it is preferred that the dimensions of the horizontal storage ports 66 and vertical storage sub-compartments 100 generally correspond to the dimensions of standard tackle box configurations. What is meant by generally correspond is that the storage ports 66 and sub-compartments 100 are configured to maintain a tackle box in a stored position without significant shifting, sliding, or tipping.

As can be seen in FIG. 3, the overall arrangement of the tackle organizer system 10 may be arranged in an angular configuration. When installed within a boat, the angular configuration orients the respective compartments in generally horizontal and vertical orientations relative to the surface of the water. In other words, the boat typically rests at an angle when afloat in the water. The angular configuration of the tackle organizer system 10 offsets the boat's angular position.

The disclosed system provides versatility in storing various sized tackle and equipment within the various storage areas of the tackle organizer system. Specifically, fishing tackle and equipment of differing sizes may be securely stored within each of the vertical storage compartments, the multiple port storage area or horizontal compartments, the utility storage area, and the tray recess arrangements.

In accord with the principles disclosed, the tackle organizer system generally assists users in organizing, placing, and storing tackle containers within the boat. It is contemplated that this tackle organizer system can be used in other applications where compartmentalized storage is desired.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A tackle organizer system for organizing fishing tackle and fishing tackle boxes in a boat, the system comprising:
   a) a storage structure, the storage structure including:
      i) a lower storage region defining a plurality of generally vertical storage compartments for vertically storing fishing tackle boxes;
      ii) an upper storage region defining:
         1) a plurality of generally horizontal storage compartments for horizontally storing fishing tackle boxes;
         2) a utility storage compartment located adjacent the horizontal storage compartments; and
      iii) a top storage tray mounted above the upper storage region, the top storage tray defining at least one recess for storing fishing tackle.

2. The tackle organizer system of claim 1, wherein:
   a) the horizontally stored fishing tackle boxes are secure in a stored position by a detachable cord.

3. The tackle organizer system of claim 2, wherein:
   a) the vertically stored fishing tackle boxes are secured in a stored position by ribs formed in the lower storage region of the storage structure.

4. A tackle organizer system for organizing fishing tackle in a boat, the system comprising:
   a) a storage box, the storage box including:
      i) a lower region; and
      ii) a first upper region;
   b) at least a first organizer insert positioned within the storage box at the first upper region, the first insert defining a plurality of lateral storage slots for lateral receipt of fishing tackle; and
   c) a plurality of vertical storage slots located in the lower region of the tackle organizer system.

5. The tackle organizer system of claim 4, wherein:
   a) the lower region includes a first side wall;
   b) the first upper region includes a first base; and
   c) the first side wall and the first base are configured to define a first step.

6. The tackle organizer system of claim 5, wherein the first organizer insert is positioned above the first base of the first upper region.

7. The tackle organizer system of claim 5, further including:
   a) a second upper region, the lower region being located between the first upper region and the second upper region.

8. The tackle organizer system of claim 7, wherein:
   a) the lower region includes a second side wall;
   b) the second upper region includes a second base; and
   c) the second side wall and the second base are configured to define a second step.

9. The tackle organizer system of claim 7, further including a second organizer insert, the second insert being positioned within the storage box at the second upper region.

10. The tackle organizer system of claim 4, further including a securing member for securing fishing tackle and equipment within the lateral storage slots.

11. The tackle organizer system of claim 10, wherein:
   a) the securing member includes an elastic cord extending across the lateral storage slots, the elastic cord having an end that is detachable from a secured position to provide access to the lateral storage slots.

12. The tackle organizer system of claim 4, wherein the first insert further defines a utility storage area having an opening adjacent the lateral storage slots.

13. The tackle organizer system of claim 4, wherein the storage box includes a flange located along a perimeter of the box, the flange including a plurality of holes for mounting the tackle organizer system to the boat.

14. The tackle organizer system of claim 13, further including a mounting strip, the mounting strip having a first surface and an opposite second surface, the first surface being adhesively joined to a deck portion of the boat, the second surface including a plurality of mounting studs that extend through the holes in the storage box flange for mounting the tackle organizer system to the boat.

15. A boat, comprising:
   a) at least one storage location configured within the boat;
   b) a tackle organizer system mounted at the storage location of the boat, the tackle organizer including:
      i) a storage box having at least a first stepped portion, the first stepped portion defining a lower region and a first upper region;
      ii) at least a first multiple slot organizer located at the first upper region, the first multiple slot organizer defining a plurality of storage slots each configured to receive a storage container; and
      iii) a plurality of vertical storage slots located in the lower region of the tackle organizer system, the vertical storage slots each configured to vertically receive a storage container.

16. The boat of claim 15, wherein:
   a) the plurality of storage slots of the first multiple slot organizer is configured to laterally receive the storage container.

17. The boat of claim 16, wherein:
   a) the storage box further includes a second stepped portion defining a second upper region.

18. The boat of claim 17, further including:
   a) a second multiple slot organizer positioned at the second upper region, the second multiple slot organizer defining a plurality of storage slots configured to laterally receive a storage container.

19. The boat of claim 18, further including:
   a) a first storage tray located adjacent the first multiple slot organizer; and b) a second storage tray located adjacent the second multiple slot organizer.

20. The boat of claim 15, wherein:
   a) the storage location at which the tackle organizer system is mounted is located below an opening in a deck of the boat.

21. A method of making an organized compartment within a boat for organizing fishing tackle and equipment, the method comprising:
   a) providing a tackle organizer system, the tackle organizer system comprising:
      i) a storage box having a lower region and at least a first upper region, the lower region defining a plurality of generally vertical storage slots;
      ii) at least a first multiple slot organizer, the first multiple slot organizer defining a plurality of storage compartments; the first multiple slot organizer being configured to provide lateral accessibility to the storage compartments; and
      iii) a mounting strip;
   b) installing the tackle organizer system beneath a decking of the boat; the step of installing the system including:
      i) providing an opening in the decking of the boat;
      ii) adhering the mounting strip to the decking of the boat adjacent the opening in the decking;
      iii) positioning the multiple slot organizer within the upper region of the storage box; and
      iv) fastening the storage box to the mounting strip.

22. The method of claim 21, wherein:
   a) the step of providing the tackle organizer system includes providing system further comprising at least a first storage tray.

23. The method of claim 22, further including the steps of:
   a) positioning the storage tray adjacent the multiple slot organizer; and
   b) attaching the storage tray to mounting structure adjacent the opening in the decking.

24. The method of claim 21, wherein:
   a) the step of providing the tackle organizer system includes configuring the generally vertical storage slots to receive utility boxes of a first size;
   b) the step of providing the tackle organizer system includes configuring the storage compartments of the first multiple slot organizer to receive utility boxes of a second size, the second size of utility boxes being different than the first size of utility boxes.

* * * * *